United States Patent
Kresse et al.

(10) Patent No.: US 7,101,313 B2
(45) Date of Patent: Sep. 5, 2006

(54) MOTOR VEHICLE POWERTRAIN CONTROL METHOD FOR LOW TRACTION CONDITIONS

(75) Inventors: John P. Kresse, Martinsville, IN (US); Ronald P. Hitch, Westfield, IN (US); Gregory A. Hubbard, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/464,309

(22) Filed: Jun. 18, 2003

(65) Prior Publication Data

US 2004/0259684 A1 Dec. 23, 2004

(51) Int. Cl.
B60W 10/04 (2006.01)

(52) U.S. Cl. ............... 477/115; 477/107; 477/111; 701/84; 701/85; 701/87; 701/90

(58) Field of Classification Search ............... 477/107, 477/111, 115, 110; 180/197; 701/84, 85, 701/86, 87, 90, 91
See application file for complete search history.

(56) References Cited

U.S. PATENT DOCUMENTS

| | | | | |
|---|---|---|---|---|
| 4,795,000 A | * | 1/1989 | Ocvirk et al. | 180/176 |
| 5,265,693 A | * | 11/1993 | Rees et al. | 180/197 |
| 5,388,046 A | * | 2/1995 | Anan et al. | 701/91 |
| 5,519,617 A | * | 5/1996 | Hughes et al. | 701/84 |
| 5,593,217 A | * | 1/1997 | Schmitt et al. | 303/139 |
| 5,671,144 A | * | 9/1997 | Ryan et al. | 701/84 |
| 5,765,657 A | * | 6/1998 | Fukumura et al. | 180/197 |
| 6,009,967 A | * | 1/2000 | Hrovat | 180/197 |
| 6,434,466 B1 | * | 8/2002 | Robichaux et al. | 701/54 |
| 6,542,806 B1 | * | 4/2003 | Suhre et al. | 701/82 |
| 6,543,414 B1 | * | 4/2003 | O'Neil et al. | 123/350 |
| 6,618,662 B1 | * | 9/2003 | Schmitt et al. | 701/82 |

* cited by examiner

*Primary Examiner*—Charles A. Marmor
*Assistant Examiner*—David D. Le
(74) *Attorney, Agent, or Firm*—Christopher DeVries

(57) ABSTRACT

A driver-initiated low traction control method limits the drive torque of a motor vehicle during operation on low traction road surfaces. The low traction control mode is initiated by actuation of a switch or by moving a transmission range selector to a Low range while the vehicle is substantially stopped, and terminated by further actuation of the switch or by returning the range selector back to the Drive setting. The low traction control mode limits the engine torque as required to limit the drive wheel torque and its rate of change, so long as cruise control is inactive, the accelerator pedal setting is less than a reference level, and the transmission is operating in a gear other than its top gear. When the low traction control mode is terminated, the engine torque limits are progressively removed in a way that does not produce perceptible acceleration or deceleration of the vehicle.

6 Claims, 3 Drawing Sheets

MOTOR VEHICLE POWERTRAIN CONTROL METHOD FOR LOW TRACTION CONDITIONS

TECHNICAL FIELD

This invention relates to a powertrain control for a motor vehicle, and more particularly to a control method that limits the vehicle drive torque during operation on low traction road surfaces.

BACKGROUND OF THE INVENTION

Many motor vehicles are equipped with automatic traction control systems that reduce the tractive effort of the vehicle through engine torque reduction and/or wheel braking when excessive wheel spin is detected. However, such systems can be expensive to implement, particularly in applications where vehicle sensors and/or actuators must be added to support the traction control function. Accordingly, what is needed is a low-cost traction control method that limits the vehicle drive torque during operation on low traction road surfaces.

SUMMARY OF THE INVENTION

The present invention is directed to a low-cost driver-initiated method of limiting the drive torque of a motor vehicle for the purpose of reducing the likelihood of wheel slip during vehicle operation on low traction road surfaces. The driver initiates a low traction control mode by actuating a control panel switch or by moving the transmission range selector to a Low range setting while the vehicle is substantially stopped, and terminates the control by further actuation of the switch or by returning the range selector back to the normal forward range setting (i.e., Drive). While active, the low traction control mode interfaces with an engine controller to limit the drive torque, so long as cruise control is inactive, the accelerator pedal setting is less than a reference level, and the transmission is operating in a gear other than its top gear or gears. In operation, the engine torque is limited as required to limit the drive wheel torque and its rate of change, and to reduce the output torque disturbance due to transmission shifting. When the low traction control mode is terminated, the engine torque limits are progressively removed in a way that does not produce perceptible acceleration or deceleration of the vehicle.

DESCRIPTION OF THE PREFERRED EMBODIMENT

The control of this invention is described in the context of a motor vehicle powertrain 10 including a conventional internal combustion engine 12 and an automatic transmission 14. The transmission 14 is preferably of the type described in the U.S. Pat. No. 4,070,927 to Polak, with an electro-hydraulic control of the type described in U.S. Pat. No. 5,601,506 to Long et al. Accordingly, the transmission and control elements shown in FIG. 1 hereof have been greatly simplified, it being understood that further detail regarding the fluid pressure routings and so forth may be found in the aforementioned patents.

Figures 1, 2:
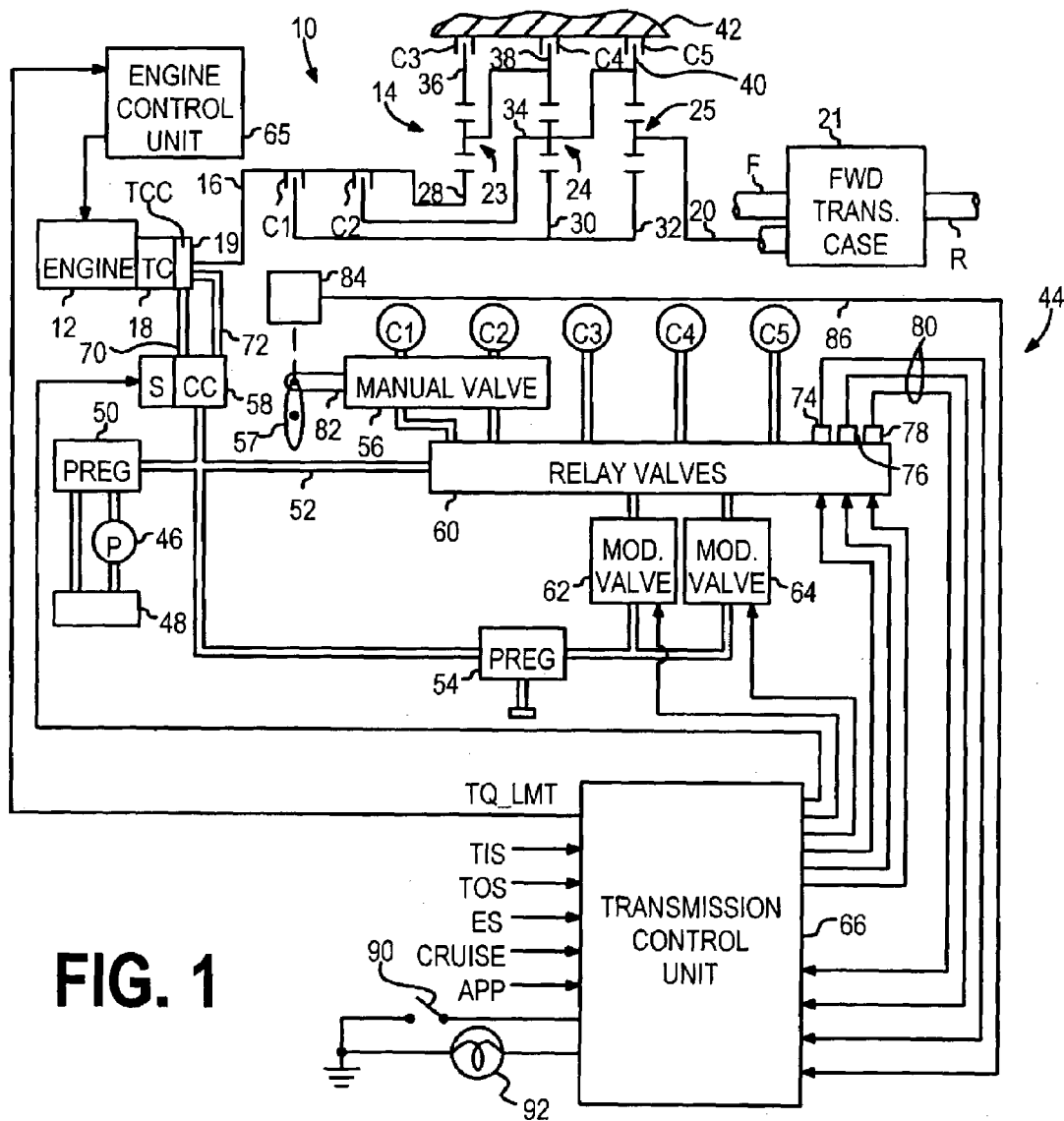
FIG. 1 is a diagram of a motor vehicle powertrain including an engine, an automatic transmission, a microprocessor-based transmission control unit, and a microprocessor-based engine control unit.
FIG. 2 is a table indicating a relationship between transmission clutch activation and corresponding speed ratio.

Referring to FIG. 1, the engine 12 is coupled to an input shaft 16 of transmission 14 through a fluidic torque converter (TC) 18 that is provided with a clutch (TCC) 19 that is selectively engaged to establish a mechanical coupling. The transmission output shaft 20 is coupled to the driving wheels of the vehicle in one of several conventional ways. The illustrated embodiment depicts a four-wheel-drive (FWD) application in which the output shaft 20 is connected to a transfer case 21 that is also coupled to a rear drive shaft R and a front drive shaft F. Typically, the transfer case 21 is manually shiftable to selectively establish one of several drive conditions, including various combinations of two-wheel-drive and four-wheel drive, and high or low speed range, with a neutral condition occurring intermediate the two and four wheel drive conditions.

The transmission 14 has three inter-connected planetary gearsets, designated generally by the reference numerals 23, 24 and 25. The input shaft 16 continuously drives a sun gear 28 of gearset 23, selectively drives the sun gears 30, 32 of gearsets 24, 25 via clutch C1, and selectively drives the carrier 34 of gearset 24 via clutch C2. The ring gears 36, 38, 40 of gearsets 23, 24, 25 are selectively connected to ground 42 via clutches C3, C4 and C5, respectively.

As diagrammed in FIG. 2, the state of the clutches C1–C5 (i.e., engaged or disengaged) can be controlled to provide six forward gears (1, 2, 3, 4, 5, 6), a reverse gear (R) or a neutral condition (N). As indicated, only clutch C5 is engaged during the neutral (N) condition; a neutral-to-drive range shift is carried out by engaging clutch C1 to establish the 1$^{st}$ forward gear, and a neutral-to-reverse range shift is carried out by engaging clutch C3 to establish the reverse (R) gear.

The torque converter clutch 19 and the transmission clutches C1–C5 are controlled by an electro-hydraulic control system, generally designated by the reference numeral 44. The hydraulic portions of the control system 44 include a pump 46 which draws hydraulic fluid from a reservoir 48, a pressure regulator 50 which returns a portion of the pump output to reservoir 48 to develop a regulated pressure in line 52, a secondary pressure regulator valve 54, a manual valve 56 activated by a driver-manipulated range selector 57 via linkage arm 82 and a number of solenoid operated fluid control valves 58, 60, 62, 64.

The electronic portion of the control is primarily embodied in the engine control unit (ECU) 65 and the transmission control unit (TCU) 66, illustrated in FIG. 1 as two separate modules. Both control units 65, 66 are microprocessor-based, and may be conventional in architecture. The ECU 65 controls the operation of engine functions such as fuel, spark timing, and so on depending on the control variables afforded by engine 12, and the TCU 66 controls the solenoid operated fluid control valves 58, 60, 62, 64 based on a number of inputs to achieve a desired transmission speed ratio. The inputs to TCU 66 include signals representing the transmission input speed TIS, engine speed ES, accelerator pedal position APP, transmission output speed TOS, and cruise control status CRUISE. Sensors for developing such signals may be conventional in nature, and have been omitted for simplicity. Additionally, TCU 66 supplies a torque limit command TQ_LMT to ECU 65 for limiting the engine output torque.

The linkage arm 82 of manual valve 56 is coupled to a sensor and display module 84 that produces an diagnostic signal on line 86 based on the control lever position; such signal is conventionally referred to as a PRNDL signal, since it indicates which of the transmission ranges (P, R, N, D or L) has been selected by the driver-manipulated range selector 57. Finally, the fluid control valves 60 are provided with pressure switches 74, 76, 78 for supplying diagnostic signals to TCU 66 on lines 80 based on the respective relay valve positions. The TCU 66, in turn, monitors the various diagnostic signals for the purpose of electrically verifying proper operation of the controlled elements.

The solenoid operated fluid control valves 58, 60, 62, 64 are generally characterized as being either of the on/off or modulated type. To reduce cost, the electro-hydraulic control system 44 is configured to minimize the number of modulated fluid control valves, as modulated valves are generally more expensive to implement. To this end, the Relay Valves 60 comprise a set of three on/off valves that are utilized in concert with manual valve 56 to enable controlled engagement and disengagement of each of the clutches C1–C5 with only two modulated valves 62, 64. For any selected gear, TCU 66 activates a particular combination of Relay Valves 60 for coupling one of the modulated valves 62, 64 to the on-coming clutch, and the other modulated valve 62, 64 to the off-going clutch. The modulated valves 62, 64 each comprise a conventional pressure regulator valve biased by a variable pilot pressure that is developed by current controlled force motor. The converter clutch valve (CC) 58 is also a modulated valve, and controls the supply fluid supply path to converter clutch 19 in lines 70, 72 for selectively engaging and disengaging the converter clutch 19. The TCU 66 determines pressure commands for smoothly engaging the on-coming clutch while smoothly disengaging the off-going clutch, develops corresponding force motor current commands, and then supplies current to the respective force motors in accordance with the current commands.

The present invention is particularly directed to a control method carried out by TCU 66 for limiting the output torque of engine 12 during activation of a low traction mode of operation. The low traction control mode is initiated by the driver, either by momentarily closing a control panel switch 90, or by moving the range selector 57 to the low forward range (L) when the transmission output speed TOS is essentially zero. A lamp 92 controlled by TCU 66 indicates the status of the low traction mode, and may be operated in a flashing mode if a failure related to the low traction control mode is detected. While the low traction control mode is active, the TCU 66 interfaces with the ECU 65 to limit the engine torque as required to limit the drive wheel torque and its rate of change, and to reduce the output torque disturbance due to transmission shifting. However, the torque limitation is suspended if the vehicle cruise control is active, the accelerator pedal setting APP is above a reference level, or the transmission 14 is operating in a high speed gear such as $5^{th}$ or $6^{th}$. The low traction mode is terminated by momentarily closing the switch 90 once again, or by returning the range selector 57 back to the normal forward range setting (i.e., Drive). When the low traction mode is terminated, the engine torque limits imposed by TCU 66 are progressively removed in a way that does not produce perceptible acceleration or deceleration of the vehicle.

Figure 3:
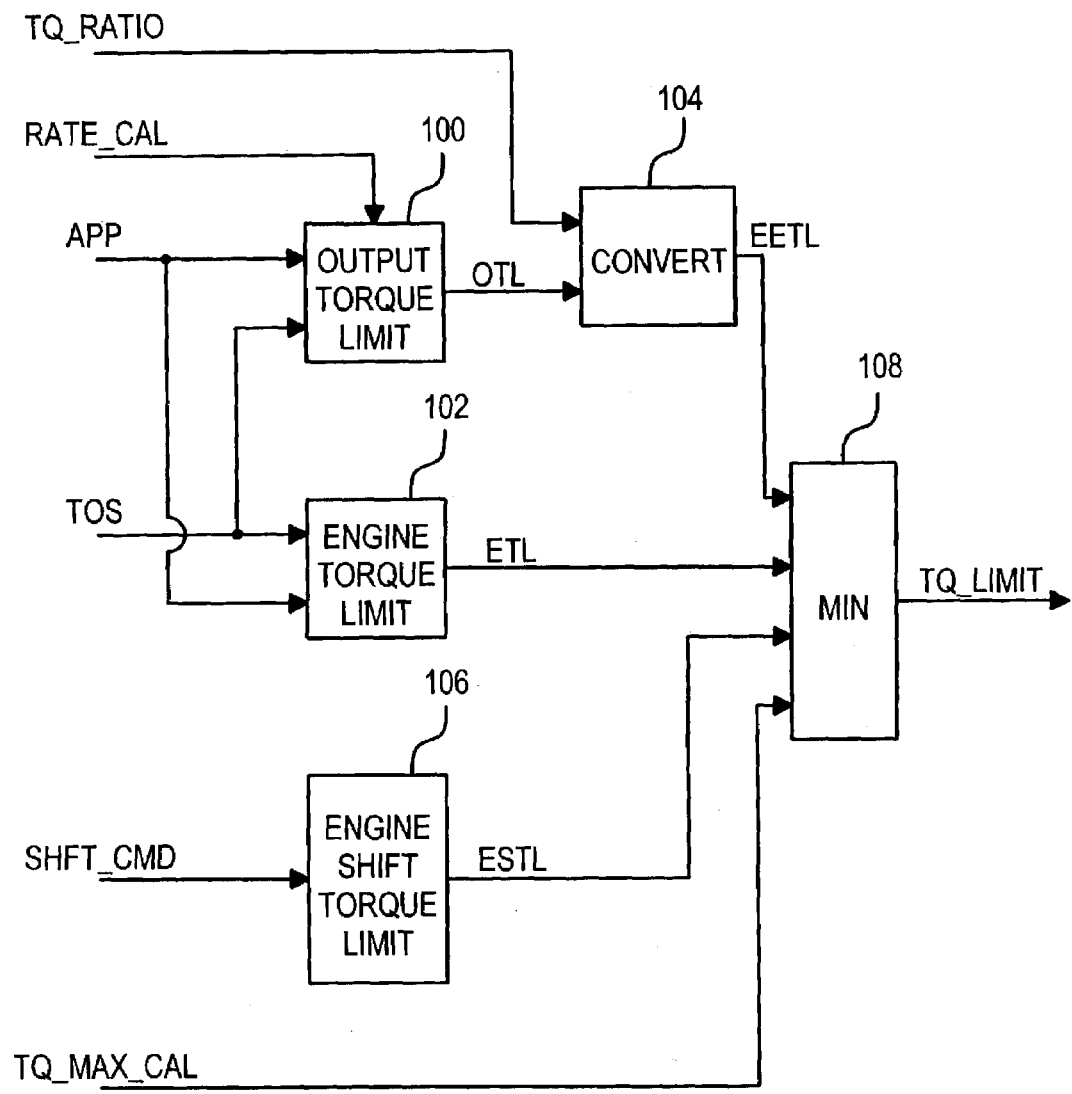
FIG. 3 is a block diagram depicting the development of an engine torque limit for improved traction according to this invention.

The block diagram of FIG. 3 illustrates how the engine torque limit TQ_LMT is developed by TCU 66 during activation of the low traction control mode. The block 100 designates a look-up table for producing a calibrated output torque limit (OTL) as a function of the accelerator pedal position APP (or another operator torque request signal) and the transmission output speed TOS, and the block 102 designates a look-up table for producing a calibrated engine torque limit (ETL) as a function of the same variables. The output of block 100 is additionally constrained by a calibrated torque rate limit (RATE_CAL) which limits the rate of change in OTL. The tables 100 and 102 can be calibrated, for example, to provide particularly aggressive torque limiting at low values of TOS and/or moderately high values of APP, and progressively less aggressive torque limiting as TOS increases and APP decreases. This reduces the likelihood of wheel slip at vehicle launch, while preserving a generally proportional relationship between APP and output torque. The block 104 receives the output torque limit OTL, and converts it to an effective engine torque limit EETL based on the torque ratio (TQ_RATIO) provided by the combination of transmission 14 and torque converter 18. The value TQ_RATIO can be computed according to the product of the torque converter torque ratio (TCTR) and the transmission gearbox torque ratio (TGTR); TCTR can be mapped as a function of the speed ratio ES/TIS, and TGTR is depends on the engaged gear. The block 106 is responsive to the generation of a transmission shift command (SHFT_CMD) and produces a calibrated engine shift torque limit (ESTL) for reducing the output torque disturbance due to transmission shifting. In the illustrated embodiment, there is additionally a calibrated engine torque limit TQ_MAX_LMT that is in effect regardless of whether the low traction control mode is active. The block 108 selects the minimum (most restrictive) of the torque limits EETL, ETL, ESTL and TQ_MAX_CAL, and provides it as the engine torque limit output TQ_LMT.

Figure 4:
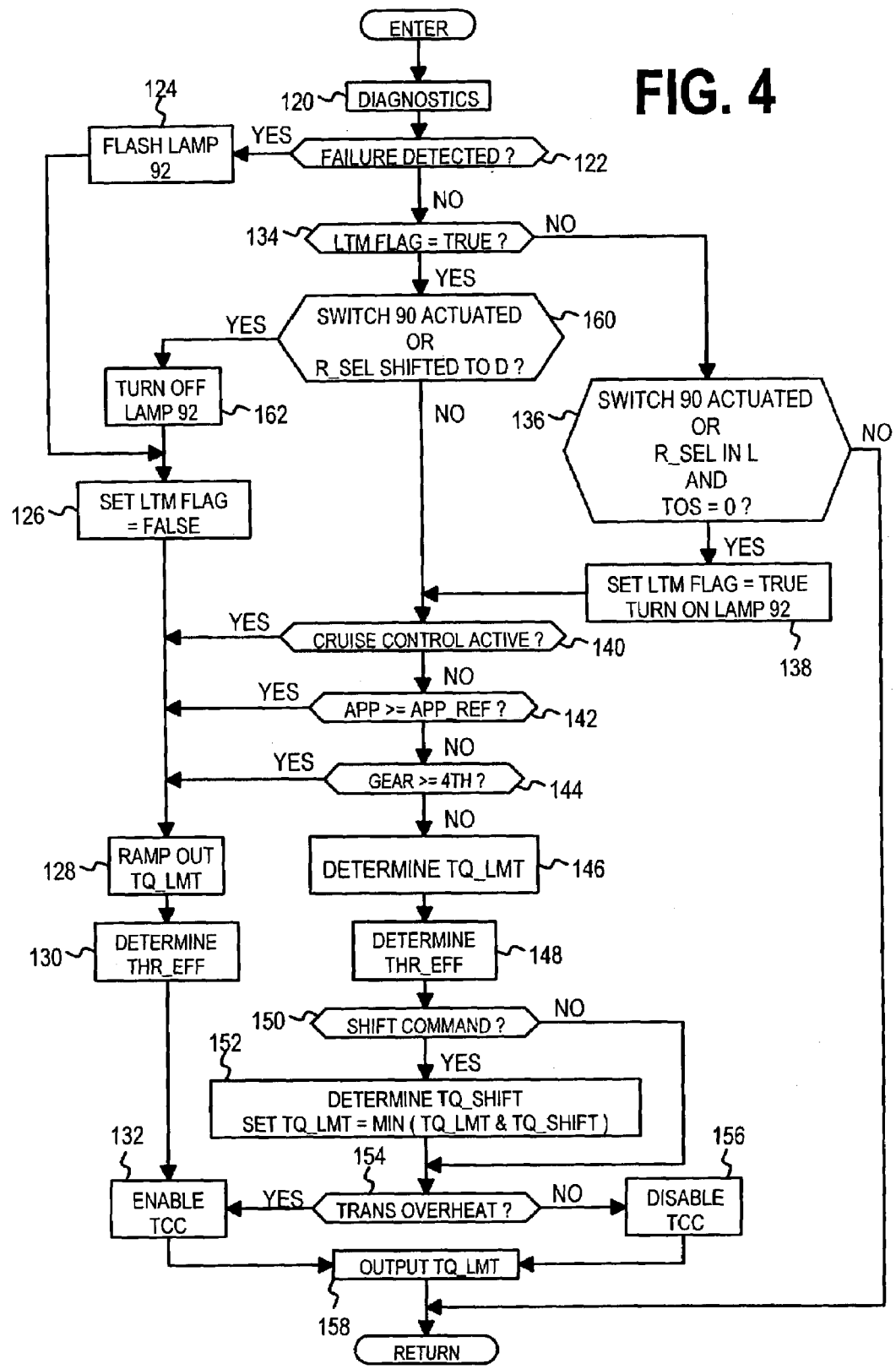
FIG. 4 is a flow diagram representative of a routine executed by the transmission control unit of FIG. 1 in carrying out the control of this invention.

The flow diagram of FIG. 4 represents a software routine periodically executed by TCU 66 to carry out the low traction control method of this invention. At each execution of the routine, the block 120 is executed to perform various diagnostic routines concerning the signals used by the low traction control mode. If a failure is detected, as determined at block 122, the blocks 124, 126, 128, and 130 are executed to activate the lamp 92 in a flashing mode, to set the Low Torque Mode (LTM) flag to FALSE, and to remove any of the limits imposed by the low traction control mode. If no failure is detected, the block 134 checks the status of the LTM flag. The LTM flag is initialized to FALSE at each engine ignition cycle, so block 134 will initially be answered in the negative. Accordingly, the block 136 is executed to determine if the switch 90 has been actuated since the previous execution of the routine, or if the range selector R_SEL 57 is in the Low (L) range and the transmission output speed (TOS) is essentially zero. Either condition is effective to activate the low traction mode, and if block 136 is answered in the affirmative, the block 138 sets the LTM flag to TRUE and turns on the LTM lamp 92 to visually confirm activation of the low traction control mode. So long as the cruise control is inactive, the accelerator pedal position APP is less than a reference APP_REF, and the transmission speed ratio (GEAR) is $4^{th}$ or less, the blocks 140, 142 and 144 will be answered in the negative, and the block 146 is executed to determine the engine torque limit TQ_LMT as described above in reference to FIG. 3. If any of the blocks 140, 142 and 144 is answered in the affirmative, the blocks 128, 130 and 132 are executed to remove any of the limits imposed by the low traction control mode so as to avoid unnecessary reduction of drive wheel torque. When the low traction control mode is active, the block 148 determines an effective throttle position or torque request signal TPS_EFF corresponding to TQ_LMT for purposes of determining a desired speed ratio. If the desired speed ratio is different than the engaged ratio, a shift is commanded; in such case, the block 150 signals the block 152 to determine an engine torque limit TQ_SHIFT for reduced shift torque disturbance, and to set TQ_LMT equal to the lesser of TQ_SHIFT and the limit value determined at block 146. Unless the transmission 14 is overly hot, as determined at block 154, the block 156 disables engagement of the torque converter clutch TCC 19 to further reduce the likelihood of wheel slip. Finally, the block 158 outputs TQ_LMT to ECM 65.

Once the low traction control mode has been activated, the block 134 will be answered in the affirmative, and the block 160 is executed to detect further actuation of the switch 90 or a return of the range selector 57 to the Drive (D) position. If block 160 is answered in the affirmative, the block 162 turns off the lamp 92, the block 126 sets the LTM flag to FALSE, and the blocks 128, 130 and 132 remove the limits imposed by the low traction mode. The block 128 progressively removes the torque limit TQ_LMT, using the calibrated rate RATE_CAL of FIG. 3 or another rate, the block 130 determines a corresponding effective throttle position signal THR_EFF, and the block 132 enables engagement of the torque converter clutch (TCC) 19. If block 160 is answered in the negative, the blocks 140–156 are executed as described above to suitably limit the engine output torque.

In summary, the present invention provides a low-cost driver-initiated low traction control mode that limits drive wheel torque to reduce the likelihood of wheel slip when the vehicle is being operated on a low traction road surface. While the invention has been described in reference to the illustrated embodiment, it is expected that various modifications in addition to those mentioned above will occur to those skilled in the art. For example, the switch 90 may be omitted if desired, the accelerator pedal position signal APP may be replaced with an operator torque request signal, and so on. Thus, it will be understood that methods incorporating these and other modifications may fall within the scope of this invention, which is defined by the appended claims.

What is claimed is:

1. A control method for a motor vehicle powertrain including an engine driving an automatic shift transmission, the method comprising the steps of:
    activating a low traction control mode in response to operator actuation of a control input;
    during activation of said low traction control mode, determining a low traction engine torque limit based on an output speed of said transmission and an operator torque request, without regard to wheel slip of said vehicle, and limiting an output torque of said engine based on the determined low traction engine torque limit;
    terminating said low traction control mode in response to operator actuation of said control input during activation of said low traction control mode; and
    limiting a rate of change of said output torque upon termination of said low traction control mode.

2. The control method of claim 1, including the steps of:
    determining a first limit on the output torque of said engine based on said output speed and said operator torque request;
    determining a second limit on the output torque of said engine during shifting of said transmission; and
    limiting the output torque of said engine during activation of said low traction control mode based on the lower of said first and second limits.

3. The control method of claim 1, where said powertrain includes a driver activated cruise control, and the method includes the steps of:
    suspending the limitation of engine output torque during activation of said cruise control; and
    commencing the limitation of engine output torque upon deactivation of said cruise control.

4. The control method of claim 1, including the step of:
    suspending the limitation of engine output torque so long as said operator torque request exceeds a reference value.

5. The control method of claim 1, including the steps of:
    determining a transmission output torque limit;
    determining a first limit on the output torque of said engine based on said transmission output torque limit;
    determining a second limit on the output torque of said engine based on said output speed and said operator torque request; and
    limiting the output torque of said engine during activation of said low traction control mode based on the lower of said first and second limits.

6. The control method of claim 5, including the step of:
    limiting a rate of change of said transmission output torque limit to a calibrated rate of change.

* * * * *